United States Patent [19]

Zulaski

[11] Patent Number: 5,796,347
[45] Date of Patent: Aug. 18, 1998

[54] CONTROL OF A DEVICE IN AN INACCESSIBLE LOCATION

[75] Inventor: John A. Zulaski, Mt. Prospect, Ill.

[73] Assignee: S&C Electric Company, Chicago, Ill.

[21] Appl. No.: 706,870

[22] Filed: Sep. 3, 1996

[51] Int. Cl.$^6$ ..................... G08B 21/00
[52] U.S. Cl. ............... 340/635; 340/514; 340/653; 340/693; 324/96; 324/537; 345/207; 345/211; 361/173
[58] Field of Search ............... 340/635, 653, 340/652, 607, 693, 514; 324/555, 96, 556, 537; 116/200, 202; 361/171, 172, 173; 341/31, 22; 345/207, 211

[56] References Cited

U.S. PATENT DOCUMENTS

| | | | |
|---|---|---|---|
| 4,533,865 | 8/1985 | Schlenk | 324/51 |
| 4,602,907 | 7/1986 | Foster | 345/207 |
| 4,608,601 | 8/1986 | Shreck et al. | 345/207 |
| 4,901,056 | 2/1990 | Bellavia et al. | 340/630 |
| 5,115,230 | 5/1992 | Smoot | 345/207 |
| 5,138,304 | 8/1992 | Bronson | 340/607 |
| 5,420,502 | 5/1995 | Schweitzer, Jr. | 324/96 |
| 5,515,079 | 5/1996 | Hauck | 345/157 |

Primary Examiner—Jeffery Hofsass
Assistant Examiner—Davetta Woods
Attorney, Agent, or Firm—James V. Lapacek

[57] ABSTRACT

An arrangement is provided to power and initiate the output of information sensed and/or stored by a device in a sealed environment having a viewing window. The device is powered and the output is initiated by the input of a light source to the device. When the output is initiated, the device provides a display representing the information. In a specific arrangement, the device scrolls to display the information on a sequential, repetitive basis while the light source is directed onto the device. In one specific embodiment, the device is powered by a solar cell or the like. In one specific application of the invention, the information represents the real-time primary voltage of components and circuitry within the switchgear. In another specific application of the invention, the device is located within a sealed switchgear enclosure and the information represents the faulted phase or phases of the power distribution circuit to which the switchgear is connected. The information is obtained and stored in a non-volatile memory before the circuit is deenergized. Alternatively, a non-volatile storage arrangement is provided that can be sensed after the circuit is deenergized, e.g. mechanical or magnetic.

11 Claims, 1 Drawing Sheet

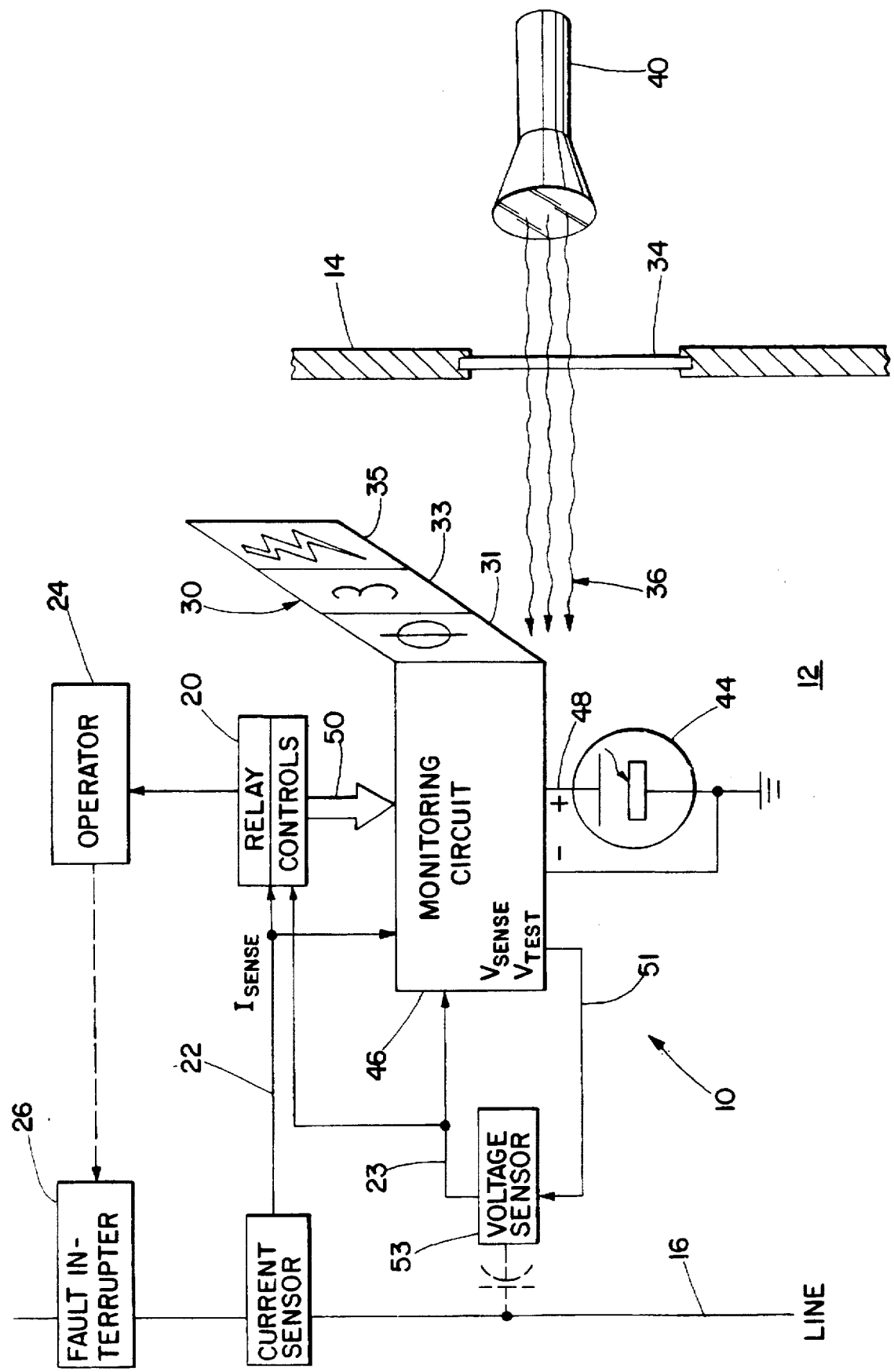

CONTROL OF A DEVICE IN AN INACCESSIBLE LOCATION

BACKGROUND OF THE INVENTION

1. Field of the Invention

The present invention relates generally to the control of devices in inaccessible locations such as sealed power distribution switchgear enclosures and more particularly to a control method and arrangement for powering an inaccessible device and initiating a desired sequence of events via a source of light.

2. Description of Related Art

For electrical power distribution networks, it is a common practice to inspect electrical systems and troubleshoot faulted sections of power distribution lines. This requires operating personnel to inspect switchgear to establish whether the switchgear is energized, the identity of the faulted line and other existing conditions. Often, the enclosed switchgear incorporate relays that respond to fault conditions to indicate a specific phase or line that has experienced a fault condition. Since the power may be interrupted to the switchgear as a result of the fault condition, the relay targets, voltage indicators, and other display indicia require another source of power. In the case of sealed switchgear, while viewing windows are provided to observe the position of circuit components, access to the interior of the switchgear is not readily available or practical. Further, conventional sources of power are expensive and require maintenance. Where batteries are utilized, either a separate charging source is necessary or the batteries must be replaced at frequent intervals to ensure their viability.

SUMMARY OF THE INVENTION

Accordingly, it is a principal object of the present invention to provide a control method and arrangement for powering and initiating the functioning of an inaccessible device via a light source.

It is another object of the present invention to actuate a device within a sealed enclosure having a viewing window to provide the sequential output of indicia representing stored status information.

It is a further object of the present invention to provide the indication of status or display of information for switchgear components within a sealed switchgear enclosure where no source of power is available within the switchgear enclosure.

These and other objects of the present invention are efficiently achieved by an arrangement to power and initiate the output of information sensed and/or stored by a device in a sealed environment having a viewing window. The device is powered and the output is initiated by the input of a light source to the device. When the output is initiated, the device provides a display representing the information. In a specific arrangement, the device scrolls to display the information on a sequential, repetitive basis while the light source is directed onto the device. In one specific embodiment, the device is powered by a solar cell or the like. In one specific application of the invention, the information represents the real-time primary voltage of components and circuitry within the switchgear. In another specific application of the invention, the device is located within a sealed switchgear enclosure and the information represents the faulted phase or phases of the power distribution circuit to which the switchgear is connected. The information is obtained and stored in a non-volatile memory before the circuit is deenergized. Alternatively, a non-volatile storage arrangement is provided that can be sensed after the circuit is deenergized, e.g. mechanical or magnetic.

BRIEF DESCRIPTION OF THE DRAWING

The invention, both as to its organization and method of operation, together with further objects and advantages thereof, will best be understood by reference to the specification taken in conjunction with the accompanying single drawing FIGURE which is a block diagram representation of a device located in a sealed switchgear enclosure illustrating the principles of the present invention.

DETAILED DESCRIPTION

Referring now to the drawing FIGURE, an illustrative device 10 is located within an inaccessible, sealed environment, e.g. as illustrated in the FIGURE, the interior 12 of a switchgear enclosure 14. In accordance with the principles and features of the present invention, it is desired to receive information about current status of components and circuits within the switchgear enclosure 14 and/or prior events that transpired within the switchgear enclosure 14, e.g. as represented by the status of physical objects and stored data representations. For example, the switchgear is connected to a power distribution circuit with energized multi-phase conductors and a ground conductor (illustrated by one phase conductor 16). During normal circuit conditions, the device 10 is powered by energy derived from the energized conductors (e.g. 16) of the power distribution circuit.

In response to faults or other conditions of the circuit, a relay 20 or other device (located locally or remotely) responds via sensed current/voltage signals at 22, 23 to open the circuit, e.g. via an operator 24 and a fault interrupter 26. After the circuit is opened at this location or upstream in the circuit, the source of power that energizes the device 10 is lost. Thus, when operating or troubleshooting personnel arrive at the switchgear enclosure 14, there is no source of power for the device 10 to display status or stored information, etc. Of great importance is the real-time primary voltage of components and circuitry within the switchgear.

Also of importance is the indication of what phase(s) of the circuit, e.g. 1,2,3, and/or G (Ground) experienced a fault condition. Commonly, overcurrent relays such as the relay 20 provide such information in the form of displays representing the faulted phase, called "targets." The operating personnel or troubleshooters need to view these targets as an aid in determining what course of action is required to restore service. However, while such a display of targets, e.g. on a display 30, would be visible through a viewing window 34 or the like in the switchgear enclosure 14, the device 10 may no longer have any source of power. Further, if a battery or other power source were provided, this requires frequent maintenance in order to be reliable.

In accordance with important aspects of the present invention, the operating personnel only need direct a light source 36 through the viewing window 34, e.g. via a flashlight 40 or them like, the device 10 being activated by the light source 36 to provide operating power and being automatically actuated to display desired information at the display 30, e.g. real-time primary voltage of components and circuitry within the switchgear, relay target representations, operator status, etc.

For example, in one specific embodiment utilizing a minimum of display components, the display 30 scrolls through a predetermined sequence of sensed and/or stored data while monitoring circuitry of the device 10 proceeds to sense, test and measure various parameters and display these results. The device 10 is arranged to continuously repeat the desired information as long as the light source 36 is present. Thus, there is no need to gain access to the device 10 to operate controls, i.e. since the device automatically supplies power and responds in a predetermined manner in response to the actuation. In other specific embodiments, the display includes multiple indicators, e.g. 31, 33, and 35, whereby the device 10 is capable of displaying various information simultaneously and may additionally be arranged to scroll one or more of the display indicators 31, 33, or 35.

Considering now the illustrative device 10 in more detail, the light source 36 illuminates a solar cell 44 which provides operating power to a monitoring circuit 46 of the device 10 over power supply connection 48. The monitoring circuit 46 is responsive to the power input at the power supply connection 48 to initiate a desired sequence, e.g. the sequenced display at 30 of sensed and/or stored data, measured parameters, status etc.

For example, as discussed hereinbefore, important information is the real-time primary voltage of components and circuitry within the switchgear 12. Thus, when actuated to perform its predetermined function, the monitoring circuit 46 tests the voltage sensing line 23, measures the parameter representations, and outputs the appropriate information via the display 30. As an illustrative example as shown in the Figure, the display 30 outputs a phase symbol "Φ", the phase identification, e.g. "1", and an energized/deenergized symbol, e.g. a lightning bolt symbol for energized and another symbol, e.g. "OFF" or "X", for deenergized.

Additionally or alternatively, as discussed hereinbefore, the information may represent data from the relay 20 on the signal lines 50 that are input to the monitoring circuit 46 before the power was interrupted, this information being stored in a non-volatile memory of the monitoring circuit 46. As an illustrative example, the display 30 outputs a phase symbol "Φ" and the identification of the faulted phase(s), e.g. "1, 2, 3 and/or G (Ground), the display being arranged either to display all the faulted phases at one time or sequentially, depending on the capacity of the display provided. Alternatively, if the relay is capable of storing target information or status representing the faulted phase or phases in a non-volatile fashion, e.g. mechanically or magnetically, the relay can be interrogated by the monitoring circuit 46 such that the relay 20 outputs this information to the monitoring circuit 46 over the signal lines at 50.

In a preferred arrangement, the monitoring circuit 46 also includes self-testing features that test the integrity of the monitoring components and circuitry so as to inform the operating personnel whether or not the switchgear is energized. For example, the indication of voltage and the self-testing features form part of a complete internal and integral system to satisfy desirable operating practices to deenergize, test and ground the circuit before working thereon. Reference is made to U.S. Pat. No. 5,521,567 for a more detailed discussion on the self-test features. Specifically, not only is the operation of the indicator at display 30 tested, the integrity of the voltage sensor and the signal path to the voltage sensor is also tested. To perform the testing function, the monitoring circuit 46 provides a voltage signal at line 51 to the voltage sensor 53, with a circuit being established through the line 51, through the voltage sensor 53 and back through the sensing line 23 to the display 30. Thus, if anything in the sensing circuitry is not operational this will be shown during testing and the display will not indicate the presence of voltage. In accordance with the present invention, this testing function is automatically actuated when the solar cell 44 is illuminated to start the test sequence, i.e. the self-test function is included in the beginning of the predetermined desired sequence of operation. Thus, the operator can rely on the accuracy of the displayed information as to the real-time voltage indication within the switchgear, i.e. whether or not the switchgear is energized.

While there have been illustrated and described various embodiments of the present invention, it will be apparent that various changes and modifications will occur to those skilled in the art. Thus, the present invention encompasses other specific implementations to achieve control of an inaccessible device via light input to provide a predetermined function such as the automatic display of a desired sequence of information or status. Accordingly, it is intended in the appended claims to cover all such changes and modifications that fall within the true spirit and scope of the present invention.

What is claimed and desired to be secured by Letters Patent of the United States is:

1. A method for powering and initiating the function of a device in an inaccessible location comprising:

storing information in response to status inputs representing the current status of operating parameters within the inaccessible location;

activating the device via a light input;

converting the light input into electrical operating power for the device;

initiating a predetermined output of information by the device in response to the activating of the device that represents the current status of operating parameters of said storing step; and displaying predetermined indicia in response to and representative of the predetermined output of information.

2. The method of claim 1 wherein said displaying step further comprises repetitively displaying the predetermined indicia while the light input is present.

3. The method of claim 1 wherein the information includes real-time sensed voltages of components within the inaccessible location.

4. The method of claim 1 wherein said initiating step comprises the steps of sensing information via one or more sensing devices within the inaccessible location and performing a self-test function of the sensing devices.

5. The method of claim 4 wherein said performing step comprises testing the continuity of a sensing path to the one or more sensing devices.

6. The method of claim 1 wherein predetermined sensing circuits are located within the inaccessible location and said initiating step comprises the step of checking the continuity of the predetermined sensing circuits in response to said activating step before initiating the predetermined output of information.

7. An arrangement for controlling the functioning of an inaccessible device within an enclosure for power distribution apparatus comprising first means responsive to a light input for providing operating power by converting the light input into electrical operating power, second means responsive to said first means to initiate the output of predetermined information, third means responsive to said output of said predetermined information for displaying representations of said predetermined information, and fourth means responsive to the power distribution apparatus for storing said predetermined information representing operating parameters of the power distribution apparatus.

8. The arrangement of claim 7 wherein said second means includes means for repeatedly controlling said output of said predetermined information.

9. The arrangement of claim 7 further comprising means for sequentially scrolling through said predetermined information.

10. The arrangement of claim 7 wherein said second means comprises means for sensing real-time information within the inaccessible device and means for initiating a testing function of the integrity of said sensing means.

11. The arrangement of claim 7 wherein said second means further comprises means for combining said predetermined real-time information and said predetermined stored information for sequential output to said third means in a predetermined manner.

* * * * *